US006215507B1

(12) United States Patent
Nally et al.

(10) Patent No.: US 6,215,507 B1
(45) Date of Patent: Apr. 10, 2001

(54) DISPLAY SYSTEM WITH INTERLEAVED PIXEL ADDRESS

(75) Inventors: Robert Marshall Nally, McKinney; Pete Edward Nelsen, Plano, both of TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/089,319

(22) Filed: Jun. 1, 1998

(51) Int. Cl.[7] .................... G06F 15/76

(52) U.S. Cl. .................... 345/516; 345/515; 711/200

(58) Field of Search .................... 345/501–503, 345/507, 509, 515, 513, 516, 517; 711/200, 202, 217, 220

(56) References Cited

U.S. PATENT DOCUMENTS

| | | | | |
|---|---|---|---|---|
| 5,185,859 | | 2/1993 | Guttag et al. | 345/513 |
| 5,269,001 | | 12/1993 | Guttag | 345/510 |
| 5,329,617 | * | 7/1994 | Asal | 345/517 |
| 5,388,207 | * | 2/1995 | Chia et al. | 345/513 |
| 5,522,027 | * | 5/1996 | Matsumoto et al. | 345/503 |
| 5,546,553 | * | 8/1996 | Robertson et al. | 711/5 |
| 5,745,739 | * | 4/1998 | Wang et al. | 345/516 |
| 5,774,135 | * | 6/1998 | Letham | 345/516 |
| 5,781,200 | * | 7/1998 | Lu et al. | 345/516 |
| 5,793,385 | | 8/1998 | Nale | 345/515 |
| 5,924,111 | * | 7/1999 | Huang et al. | 711/5 |
| 5,949,429 | * | 9/1999 | Bonneau et al. | 345/433 |
| 5,990,912 | * | 10/1999 | Swanson | 345/516 |
| 6,064,407 | * | 5/2000 | Rogers | 345/516 |

* cited by examiner

*Primary Examiner*—Ulka J. Chauhan
(74) *Attorney, Agent, or Firm*—Gerald E. Laws; W. James Brady, III; Frederick J. Telecky, Jr.

(57) ABSTRACT

Apparatus for generating and displaying data on a monitor 28 such as a CRT of LCD display. The display is comprised of a plurality of images, each located at positions on the face of the monitor defined by multi-digit coordinate values in a multi-coordinate system. Units of data are stored in linear display memory 26, each such unit of data corresponding to and defining the image to be displayed at one of said positions. The apparatus includes a circuit 60 which places selected bits of said multi-digit coordinate values in a preselected order to define the address or offset in said linear display memory at which is located the corresponding unit of data.

10 Claims, 5 Drawing Sheets

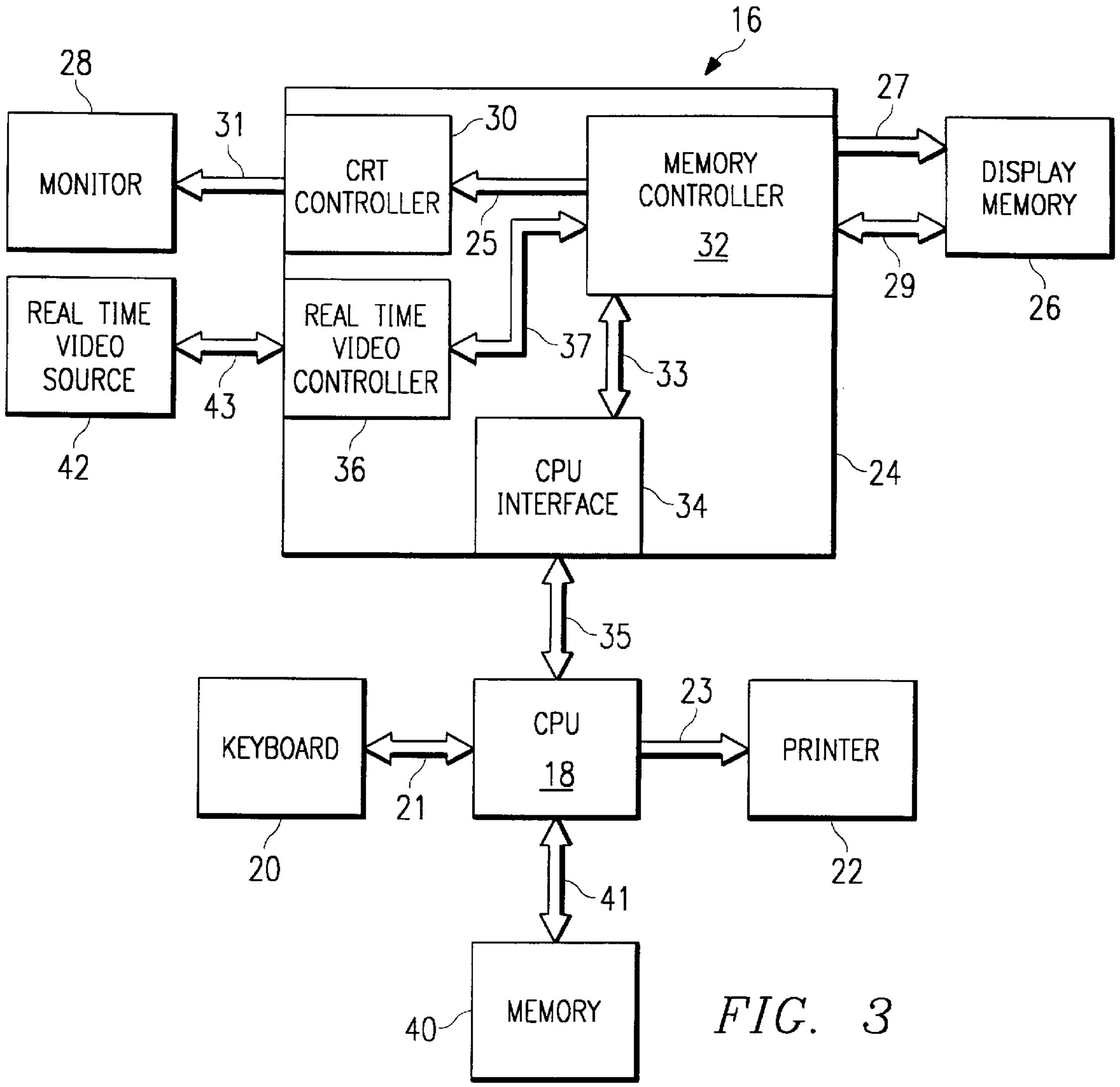
FIG. 3
FIG. 4
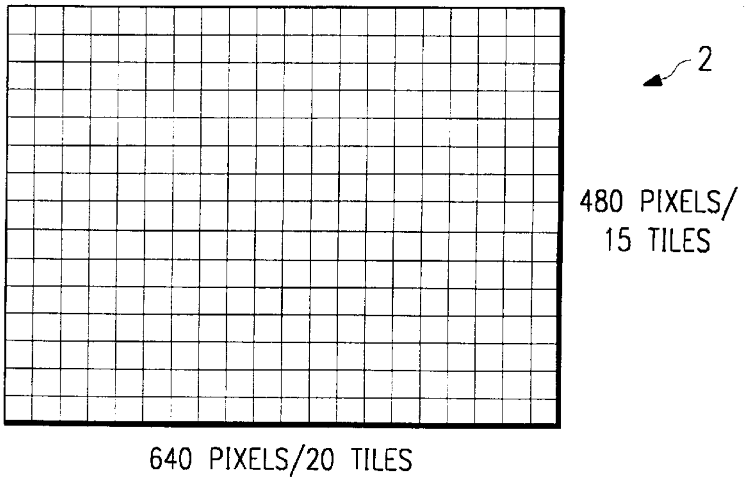

DISPLAY SYSTEM WITH INTERLEAVED PIXEL ADDRESS

BACKGROUND OF THE INVENTION

The invention relates to computer generated displays and in particular to an improved display memory controller.

Within the architecture of many personal computers, graphics and video data are stored in a display memory. The interface to this display memory is through a memory controller often contained within a graphics/video controller subsystem.

Typically, there are at least four devices in the computer system that can access the display memory. These devices are the CRT controller, real time video controller, bitBLT engine, and system logic (CPU) interface. The CRT controller reads data out of display memory and supplies it to a monitor interface to be displayed on the monitor such as a CRT or LCD display. The real time video controller collects streaming video data from an external video source and writes it to display memory. The bit block transfer (bitBLT) engine controls the movement of rectangular blocks of data from one area of display memory to another. The system logic (CPU) interface passes along display memory read and write requests from the host CPU.

A computer graphics monitor is, by nature, a two-dimensional pixel-oriented device, whereas the display memory is, by nature, a linear, byte-oriented device. In a linear memory, the byte(s) of data which defines the nature of the display that is to be generated at a particular pixel location is located at a specific location within the memory and is located by a single address rather than by two or more coordinates. When the display memory is to be accessed, the x and y coordinates of the pixel that needs to be read or written must be provided. Within the memory controller a translation must occur from the x,y pixel coordinate to the linear display memory address where the data for the pixel is stored. This display memory address may be expressed in the form of an "offset", that is the distance between the actual address of the data for the pixel and the initial address in the display memory at which the display data begins. Currently, within common personal computer architectures, the display memory address of a pixel at coordinate x & y is calculated by multiplying the number of pixels per line of the display raster (pitch) by the "y" coordinate of the pixel location, then adding the "x" value of the pixel location. Within the memory itself, the data for the pixels are stored in raster order starting with the data for the pixel at the top left corner and ending with the data for the pixel in the bottom right corner. The actual address offset in display memory will depend upon the color depth that is being used to store the graphics data (e.g. 4 bits-per-pixel (bpp), 8 bpp, 16 bpp, 24 bpp, 32 bpp, etc.) By way of example, in a computer display with 640 pixels in the "x" direction and 480 pixels in the "y" direction (e.g. 640×480 screen resolution), consider a pixel at coordinate x=240, y=160. The address (offset) of the data for this pixel would be (160×640)+240=102,640 (decimal).

The translation in the memory controller from the x,y pixel address to the corresponding offset in display memory requires a "multiplier" and an "adder". Such devices are costly in terms of required die area on an integrated circuit. It is desirable, therefore, to have an alternative method and apparatus for performing the translation, but one which dispenses with the multiplier/adder requirement.

SUMMARY OF THE INVENTION

The above and other needs are met by eliminating the multiplier and adder required by the typical current implementations and creating the display memory offset address by interleaving the pixel x-coordinate and pixel y-coordinate bits.

More specifically, in the preferred embodiment, the computer display is divided conceptually into 32 pixel by 32 pixel blocks (tiles). In the case of a 640 pixel by 480 pixel screen resolution, 640 pixels in the x direction is equivalent to twenty tiles and 480 pixels in the y direction is equivalent to fifteen tiles. Within each tile, the offset for a given pixel location in that tile from the initial address for that tile is given by using a bit-by-bit interleaving of x and y coordinates for that pixel as follows: $y_4y_3x_4x_3y_2x_2y_1y_0x_1x_0$. The offset for the pixel data is much more readily generated in this manner than is the case with existing approaches using a multiplier and adder.

The use of this improved addressing method, however, requires a rearrangement of the pixel data in the display memory. In conventional structures it is common to store the data for all the pixels of a scan line in contiguous memory locations, followed by the data for all the pixels of the next succeeding scan line, etc. As will be better understood from the following detailed description, in the preferred embodiment of the invention, data for the first four pixels of a scan line are stored in contiguous locations, followed by data for the first four pixels of the next scan line. The specifics of this "zig-zag" ordering within a tile is a function of the order in which the bits of the pixel x and y coordinates are interleaved. Suffice to say that all the data for the pixels of a given tile is stored in contiguous locations of the display memory. The particular bit interleave order in this embodiment was carefully chosen to optimize the storage of graphics data in memory. Other interleave orders are, of course, within the contemplation of this invention.

The page size of many DRAMs is 1024 bytes. For a pixel depth of eight bpp, each tile would require one DRAM page. Likewise, for pixel depths of sixteen bpp, 24 bpp, and 32 bpp, each tile would require two, three and four DRAM pages respectively. Therefore, a 32 by 32 tile will always be DRAM page-aligned, regardless of the color resolution used. This simplifies management of the memory.

The offset for a given tile is developed by interleaving the higher order bits of the x and y locations for any pixel located within that tile. This interleaving is as follows: $x_{10}y_9y_8x_9x_8y_7x_7y_6x_6y_5x_5$. This is to be distinguished from the interleaving using the lower order bits. The address using the lower order bits gives the offset of the data for a given pixel from the beginning address of its tile, and where the units of the measurement are memory locations. In the case of the offset using the higher order bits, the offset is given from the initial location of the display data in the display memory, but the units of the offset are the number of tiles preceding the given tile in memory.

Finally, the offset for the data for a given pixel, in units of memory locations from the initial location of the display data in the display memory and in units of memory locations is given by concatenating the addresses from the lower order and higher order bits of a particular pixel location as follows:

$$x_{10}y_9y_8x_9x_8y_7x_7y_6x_6y_5x_5y_4y_3x_4x_3y_2x_2y_1y_0x_1x_0.$$

It should also be noted that, due to the zig-zag ordering of the pixel data within the files, memory is partitioned into 4×4 and 8×8 sub-tiles. This organization is ideal for 3D graphics where everything (displayable objects, characters, etc.) is broken down into 2D triangles and rendered onto the display as groups of triangles. These are very intense 2D operations and the x,y ordering of memory used in the practice of this invention actually improves the efficiency and performance of the graphics engine.

BRIEF DESCRIPTION OF THE DRAWINGS

FIG. 3 shows a typical computing system embodying the invention.

FIG. 4 shows the division of the face of a display monitor into tiles.

DESCRIPTION OF THE PREFERRED EMBODIMENT

Figure 1:
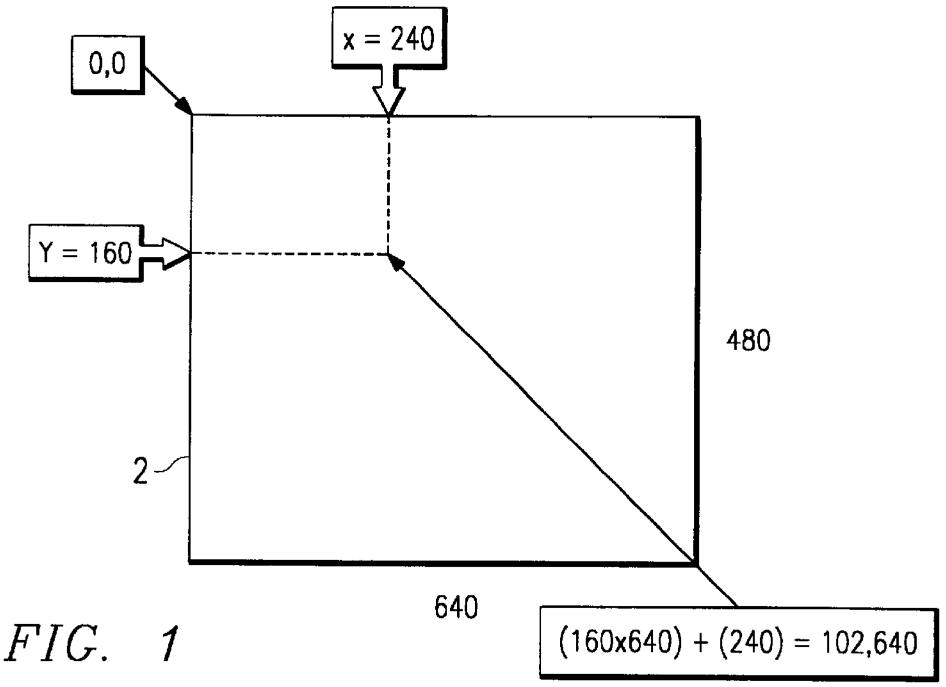
FIG. 1 illustrates the geometry of the face of a typical display monitor for a computing system.

FIG. 1 is an illustration of the geometry of a typical display screen 2 of a computer monitor which might be used in the practice of this invention. Each row (the "x" direction) of the screen or raster has 640 pixels and there are 480 such rows (the "y" direction). Data stored in display memory is used to control the color and intensity of the display that is to be created at each pixel, that is at each discrete x and y location. Let this data be denoted by the function, P(x,y). While the pixel locations are defined by their x and y coordinates, the data P(x,y) is commonly stored in a linear memory, that is a memory where the location of each data entry P(x,y) is identified by a single address. FIG. 1 shows a particular pixel location having coordinates x=240 and y=160. In the prior art it is well known to store the pixel data for the pixels of the first row of the display in the first 640 contiguous locations in display memory, the data for the second row in the next 640 contiguous locations, etc. When the data is so located in display memory, the x and y coordinates of any given pixel location can be translated to the corresponding data location in display memory (the "offset"). In the case of the illustrated pixel location, for example, this is done by taking the product of the y coordinate (the number of rows preceding the row in which the pixel is located) and the "pitch" or number of pixels in a row (640) and adding to this product the x coordinate of the pixel, 240. In this example the offset turns out to be 102,640 when expressed as a decimal number. That means that the data, P(240,160), is located in memory at a point 102,640 data entries removed from the location of P(0,0).

Figure 2:
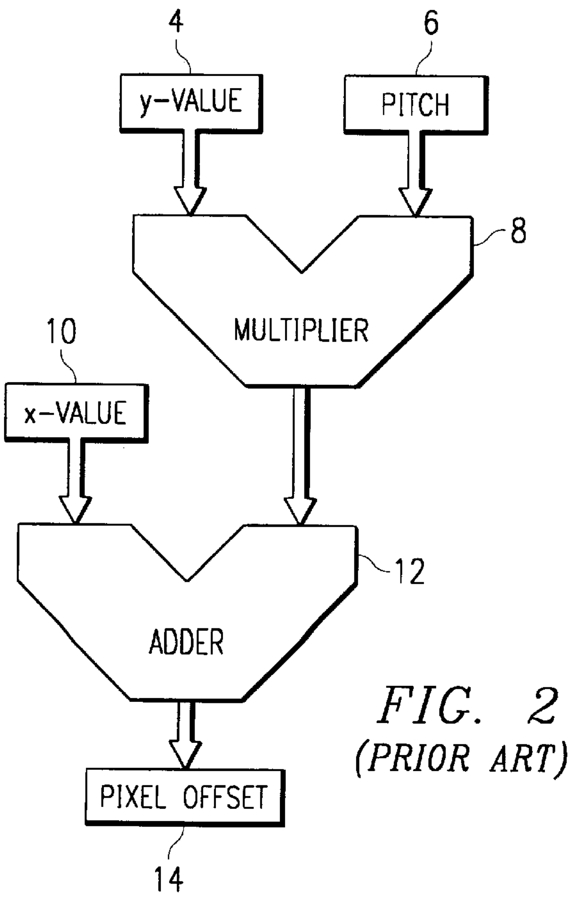
FIG. 2 (PRIOR ART)
FIG. 2 illustrates a prior art apparatus for generating the data address or offset in display memory.

FIG. 2 illustrates a typical prior art apparatus used to translate the screen address of a given pixel to an offset address which is then used to access the corresponding data for the pixel from display memory. The value of the y-coordinate of the pixel in question appears in register 4. The product of this y-value and the pitch value for the display (a constant resident in register 6) is formed by multiplier 8 and provides one input to adder 12. The other input to adder 12 is the value of the x-coordinate of the pixel in question which appears in register 10. The output of the adder represents the offset of the data for the pixel in display memory and appears in register 14. The apparatus illustrated in FIG. 2 may typically be found in the memory controller section of a graphics/video controller subsystem and commonly comprises a portion of a one-chip graphics/video controller.

A typical personal computer 16 utilizing the present invention is illustrated in block diagram form in FIG. 3. As is well known in the art, personal computer 16 includes a main processor or CPU 18. CPU 18 communicates with a manually operated keyboard 20 via bus 21 and with a printer 22 via bus 23. CPU 18 also communicates with memory 40 via bus 41. Memory 40 may represent any of various types of storage devices such as DRAM memory, hard disk, floppy disk or others well known in the art. While the various connections between elements are shown in FIG. 3 as busses, in some cases serial communications or a combination of serial and parallel links may be used alternatively.

CPU 18 also communicates with graphics/video display processor 24 via bus 35. While not necessarily the case, graphics/video display processor 24 often constitutes a single-chip integrated circuit device. Subject to modification as will be described hereinafter to incorporate features of this invention, qraphics/video display processor 24 may be a CL-GD5446 64-bit VisualMedia™ Accelerator device available from Cirrus Logic of Fremont, Calif. While detailed data sheets are available from Cirrus Logic for this graphics/video display processor, only those portions necessary to an understanding of the invention are shown in FIG. 3. CPU interface 34 serves to provide for proper communication between device 24 and CPU 18. Memory controller 32 communicates with display memory 26 via bus 27 to provide control and addresses to memory 26 and via bus 29 for the exchange of data with the memory. Bus 33 provides on-chip communication between memory controller 32 and CPU interface 34. External video signals, such as from real time video source 42, are coupled by bus 43 to on-chip RT video controller 36 which in turn_ communicates with memory controller 32 via bus 37.

Display data acquired by memory controller 32 from display memory 26 is communicated via bus 25 to CRT controller 30. CRT controller 30 in turn provides the signals necessary for operation of monitor 28 via bus 31. These signals include control signals such as HSYNC and VSYNC as well as the RGB signals which determine the nature of the display at each pixel location.

When a prior art translator such as that shown in FIG. 2 is to be used in a system such as that shown in FIG. 3, it would typically appear as part of memory controller 32. As will be shown hereinafter, this apparatus can be replaced with significantly simplified structure in accordance with the practice of this invention.

FIG. 4 is another representation of the display screen 2 of a computer monitor such as monitor 28 of FIG. 3. A typical monitor might be a CRT or LCD display. In the case illustrated in FIG. 4, the display is a raster display wherein each row of the raster contains 640 pixels and there are 480 such lines of pixels in the display. The 480×640=307,200 pixels of this display may be thought of conceptually as being divided into tiles, each comprising a 32×32 matrix of pixels. Each of the squares of FIG. 4 represents one such tile on the display screen 2 of the monitor. Each row of tiles contains twenty such tiles, while each column contains 15 such tiles. This division into tiles is useful in understanding the principles of the invention.

Figure 5:
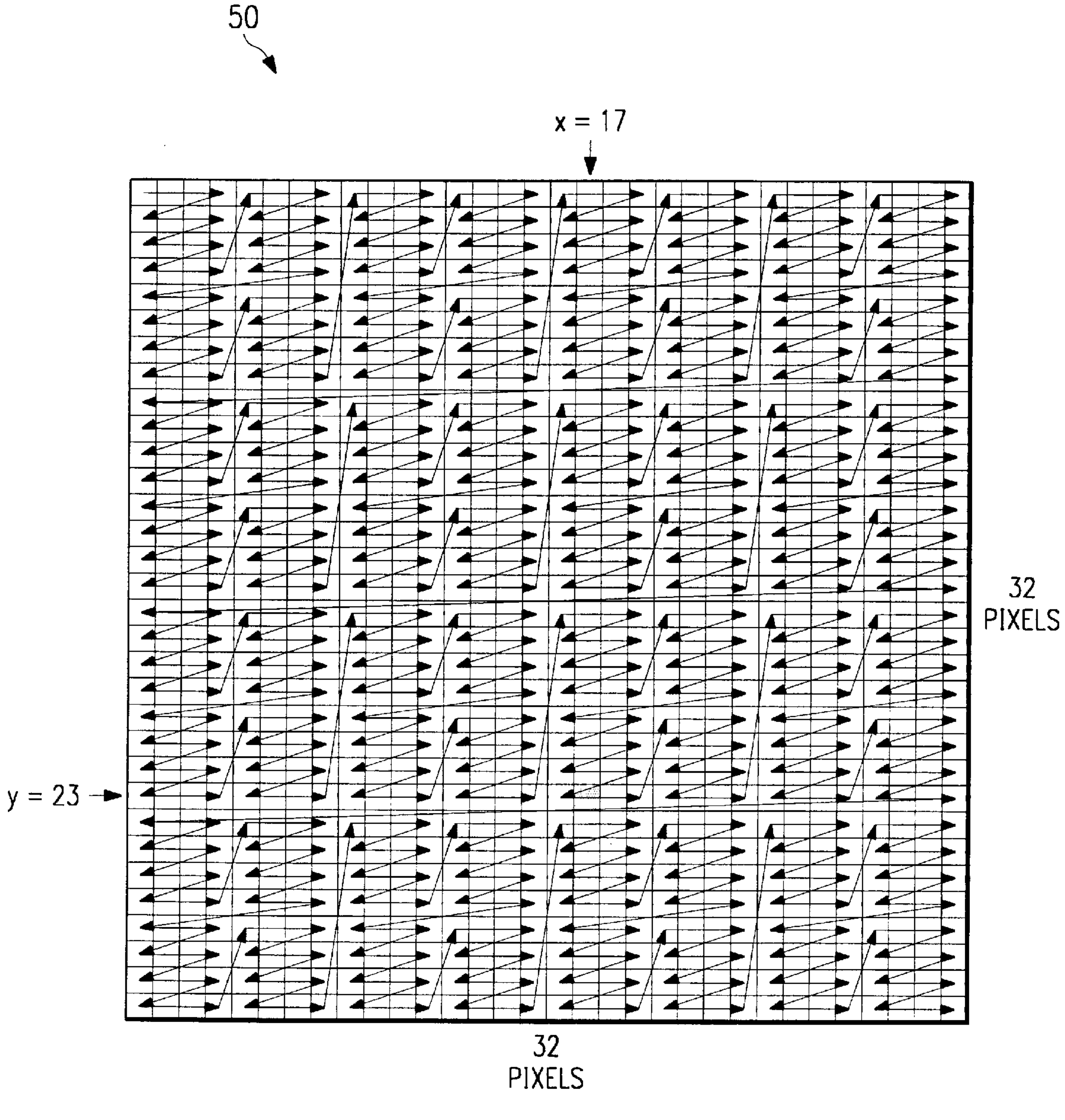
FIG. 5 illustrates the order in which data values are stored in display memory in accordance with the principles of the invention.

FIG. 5 is a representation of one such 32×32 tile 50. Each of the squares of FIG. 5 illustrates a pixel location within tile 50. The arrowed zig-zag line shows the order in which the discrete function P(x,y) defining the display at each pixel location is stored in the linear display memory. Thus the data stored in the display memory corresponds to the various pixels in the x/y coordinate order 0/0, 1/0, 2/0, 3/0, 0/1, 1/1, 2/1, 3/1, 0/2, 1/2, etc.

Figure 6:
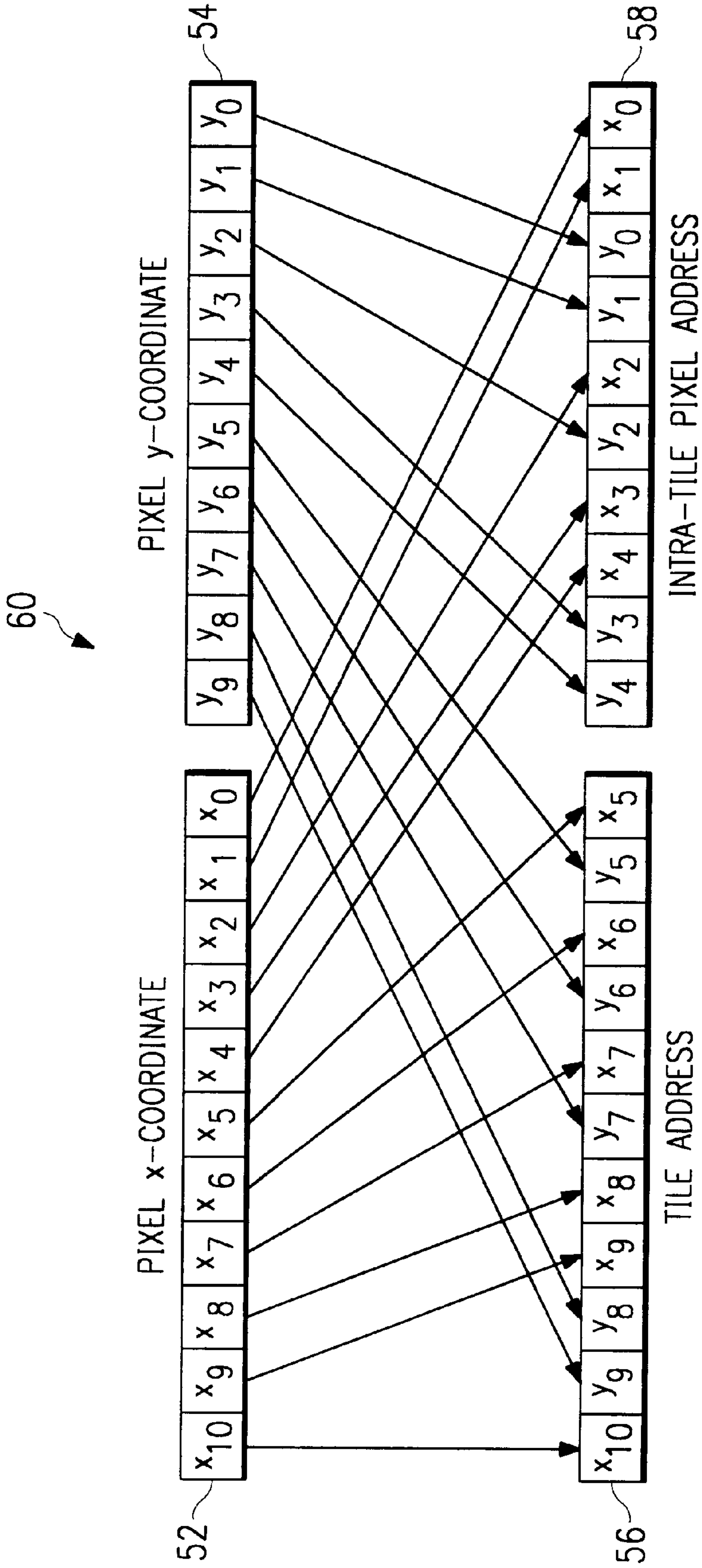
FIG. 6 shows a circuit for generating the address or offset of data values in display memory.

An address translator 60 for generating the offsets in accordance with the principles of this invention is illustrated in FIG. 6. Here the multibit addresses of the x and y coordinates of a particular pixel location appear in registers 52 and 54 respectively. Memory controller 32 receives the x and y coordinates and stores them in registers 52 and 54 respectively for use in the translation process. Registers 52 and 54 may be similar to registers 10 and 4 of the prior art representation of FIG. 2. Address translator 60 also includes registers 56 and 58. Register 58 contains the intra-tile pixel offset for the data P(x,y) that defines the color and intensity of the pixel located at the x and y coordinates contained in registers 52 and 54. As noted previously, this intra-tile pixel offset is the distance between the first memory location at which is stored pixel data for this tile and the location where the specific pixel data for the pixel at these x and y coordinates is stored. As illustrated in FIG. 6, this intra-tile pixel offset is generated by coupling certain lower order bits of the x and y coordinate addresses in registers 52 and 54 to register 58 such that the offset address in register 58 is comprised of the x and y address bits in the order $y_4y_3x_4x_3y_2x_2y_1y_0x_1x_0$.

With reference again to FIG. 5, consider the pixel located at x/y coordinates 17/23. Tracing the zig-zag path which shows the order in which the data corresponding to the pixels of this tile appear in the linear display memory, it will be seen that the data for the pixel at x=17, y=23 is located at the 686th data location in the portion of the display memory devoted to this tile. The x address, 17, has a binary representation of 10001 while the y address, 23, has a binary representation of 10111. With these values it will be seen that the binary number appearing in register 58 of FIG. 6 has the value 1010101101 (decimal 685). Thus the translation of the x and y addresses as illustrated in FIG. 6 indicates that the offset of the data for this pixel from the first element of linear display memory dedicated to this tile is 685. This confirms that the data for this pixel is indeed the 686th entry for this tile in display memory 26.

Again with reference to FIG. 6, the contents of tile address register 56 are seen to be selected higher order bits from the pixel x and y coordinate addresses. These pixel coordinate address bits are stored in register 56 in an order such that the resultant address created in register 56 defines the offset of the tile containing the pixel addressed by the x and y coordinates. The offset in this case is measured in terms of the number of tiles from the first tile in display memory, that is the upper leftmost tile on the display screen. If, for example, the number in register 56 has a decimal equivalent value of 329, that means that data for this tile in display memory is displaced by 329 tiles from the data for the upper leftmost tile on the display screen.

Figure 7:
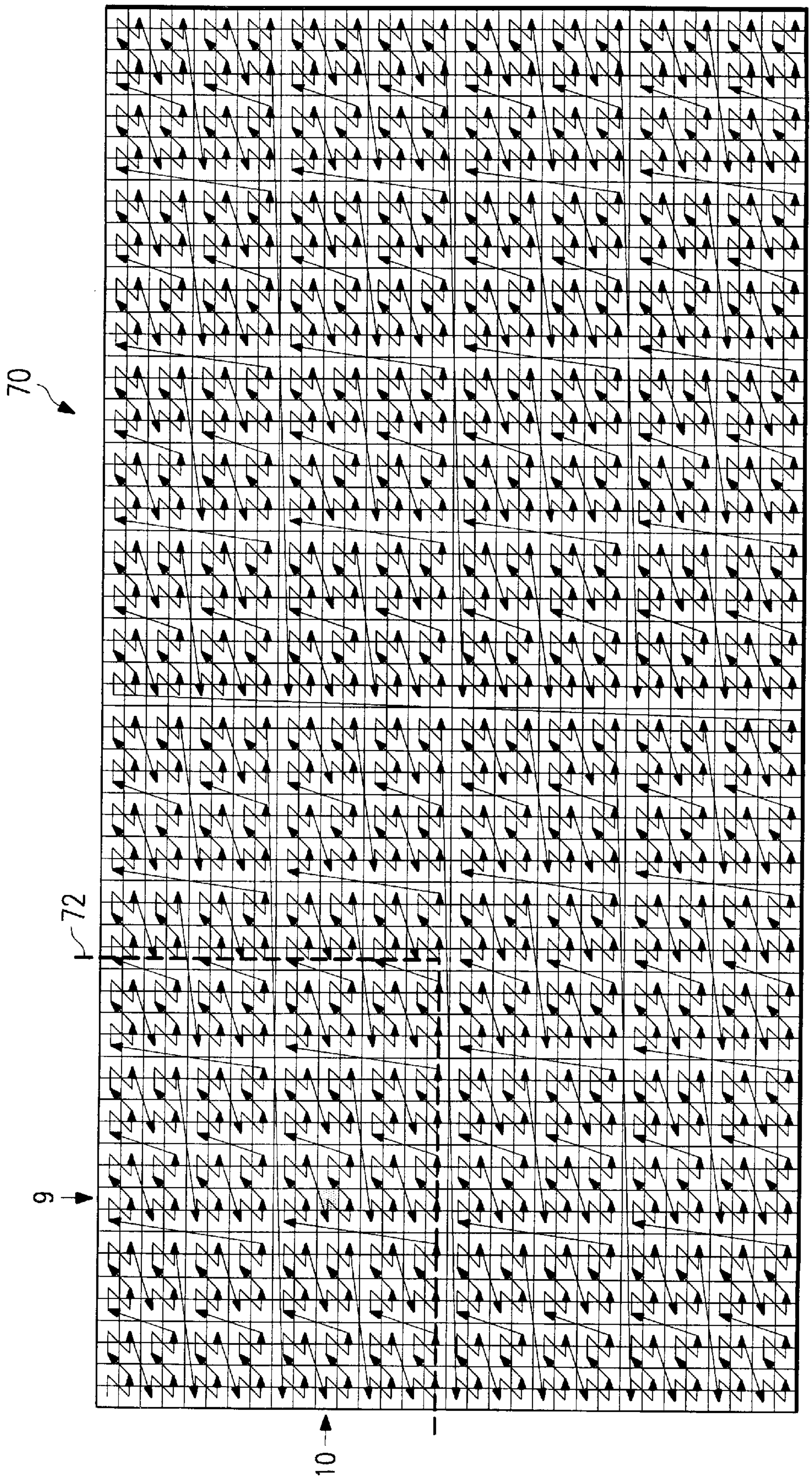
FIG. 7 shows the order in which tiles of data are ordered in display memory.

FIG. 7 is a representation of the geometry of a display screen 70 divided into tiles. Each square of FIG. 7 represents one tile. In this case the screen has a dimension of 64 tiles in the x direction and 32 tiles in the y direction. The arrowed zig-zag line shows the order in which data for the various tiles is ordered in display memory. As before, FIG. 7 can be used to illustrate that the number formed in register 56 does indeed represent the offset in display memory of data for the tile containing the x and y addresses of registers 52 and 54. Assume that the pixel of interest is located in the tile having an x tile coordinate of decimal 9 and a y tile coordinate of decimal 10 as illustrated in FIG. 7. Assume further that, within the tile, the pixel is located at x pixel coordinate 17 and y pixel coordinate 23 as illustrated in FIG. 5. The complete address for this pixel then will be at x coordinate 00100110001 and y coordinate 0101010111. The content of register 56, the tile offset, then will be 101001001 which has a decimal equivalent of 329. This means that the data for the pixels in this tile are offset by 329 tile locations from the data for the pixels of the first tile in the display (the upper leftmost tile). Following the arrowed path of FIG. 7 from the upper leftmost tile to the tile located at x=9, y=10 shows that this latter is the 330th tile in display memory and has an offset of 329 tiles from the first tile.

Given that this tile has an offset of 329 and that the pixel located at x=17 and y=23 has previously been shown to have a pixel offset of 685, the total pixel offset within display memory is equal to the tile offset multiplied by the number of pixels within each tile and added to the pixel offset within the tile. For this example, this total pixel offset is 329 tiles×1024 pixels per tile+685 pixels=337,581.

While the contents of register 56 have been shown to represent the tile offset, and the contents of register 58 have been shown to represent the pixel offset within a tile, the two registers may be regarded as one concatenated register, the content of which is the total pixel offset within the display memory array. This total concatenated offset address, in the case of the example above, will have a binary value of 001010010011010101101. This has the decimal equivalent 337,581.

Comparing FIGS. 4 and 7, it will be recalled that the representative display screen 2 of FIG. 4 has only 20 tiles in the x direction and 15 tiles in the y direction. The display screen 70 of FIG. 7, however, has 64 tiles in the x direction and 32 tiles in the y direction. In the preferred embodiment, it is desired that the data for the various tiles be stored in display memory 26 in the order shown in FIG. 7. This can be done for screens having dimensions less than the 64 tiles×32 tiles of FIG. 7. Imagine conceptually that the 15 tile by 20 tile screen 2 of FIG. 4 be superimposed on the upper left hand corner of FIG. 7. It is bounded then by dotted line 72 of FIG. 7. Now the order in which the pixel data for screen 2 is stored can be determined. By following the arrows of FIG. 7 it will be seen that the first 144 tiles of data for screen 2 are stored in contiguous locations of memory 26. The next sixteen blocks of FIG. 7 (tile locations if they were within the boundaries of screen 2) lie outside the area of screen 2. Thus the memory locations corresponding to these sixteen blocks (16 tiles×1024 memory addresses per tile=16,384 memory addresses) can be devoted to storage of data other than the display data for screen 2. Then the next 16 tiles of data in memory 26 are within the area of screen 2 and will contain display data for those locations. Continuing this process shows the remaining order in which other data is interspersed with the display data for screen 2 so as to allow addressing of display memory 26 in accordance with the principals of this invention.

Registers 56, 58, or their concatenated version will provide the correct tile offset, pixel offset, or overall pixel offset respectively only if data is stored in linear display memory 70 in the order shown by FIG. 7. As shown above, this means that sequential display memory 26 will have interspersed some data which corresponds to pixel locations of display screen 2 and other data which does not correspond to any of these pixel locations. This additional memory may be used for purposes other than for storing pixel data, and is addressed by means (not shown) other than the pixel addressing mechanism of FIG. 6. It is a certainty, however, that any offset address generated by the address mechanism 60 of FIG. 6 will identify a memory location in which pixel data is stored, that is data corresponding to pixels located in one of the tiles of screen 2.

Although the invention has been described with reference to a specific embodiment, this description is not meant to be construed in a limiting sense. Various modifications of the invention will become apparent to persons skilled in the art upon reference to the description of the invention. It is therefore contemplated that the appended claims will cover any such modifications or embodiments that fall within the true scope of the invention.

What is claimed is:

1. A graphic display system comprised of:

a. a display device for providing a display further comprised of a plurality of visible images, each said visible image being located at a discrete position of said display defined by the values of at least two coordinates of a coordinate location system, the value of each of said coordinates being comprised of a multi-bit number;

b. a linear memory device for storing units of data, each of said units corresponding to one of said discrete positions and defining the image to be displayed at said discrete position, c. an addressing system, said addressing system having an intermingling circuit that positions selected bits of the multi-bit numbers in a predetermined order to form an address such that a first plurality of bits selected from a first coordinate value are interleaved with a second plurality of bits selected from a second coordinate value, and wherein a third plurality of bits selected from the first coordinate value are interleaved with a fourth plurality of bits selected from the second coordinate value such that the first plurality of bits and the second plurality of bits are not interleaved with the third plurality of bits and the fourth plurality of bits.

2. The graphic display system of claim 1 further comprising a set of first registers, in each of which is temporarily stored one of said multi-bit numbers, an output register in which is developed said address, and a plurality of connectors, each serving to connect a bit position in one of said first registers to a bit position in said output register in an interleaved manner.

3. The graphic display system of claim 1 wherein said coordinate location system is a two-dimensional system having orthogonal coordinates.

4. The graphic display system of claim 3 wherein said plurality of visible images further comprises a plurality of rows and columns of images and wherein at least some pairs of units of data which correspond to pairs of visible images which are contiguous with each other along one of said rows are stored in locations of said linear memory that are non-contiguous.

5. The graphic display system of claim 1 further comprising a circuit responsive to one of said units of data to control the visible image at the corresponding discrete position of said display.

6. An electronic apparatus comprised of:

a. computational apparatus for generating data to be displayed, b. a display device for providing the display of said data, said display further comprised of a plurality of visible images, each said visible image being located at a discrete position of said display defined by the values of at least two coordinates of a coordinate location system, the value of each of said coordinates being comprised of a multi-bit number;

c. a linear memory device for storing units of data, each of said units corresponding to one of said discrete positions, d. an addressing system, said addressing system having an intermingling circuit that positions selected bits of the multi-bit numbers in a predetermined order to form an address such that a first plurality of bits selected from a first coordinate value are interleaved with a second plurality of bits selected from a second coordinate value, and wherein a third plurality of bits selected from the first coordinate value are interleaved with a fourth plurality of bits selected from the second coordinate value such that the first plurality of bits and the second plurality of bits are not interleaved with the third plurality of bits and the fourth plurality of bits.

7. The electronic apparatus of claim 6 further comprising a set of first registers, in each of which is temporarily stored one of said multi-bit numbers, an output register in which is developed said address, and a plurality of connectors, each serving to connect a bit position in one of said first registers to a bit position in said output register in an interleaved manner.

8. The method of claim 6 wherein said plurality of visible images further comprises a plurality of rows and columns of images and wherein said step of storing comprises storing, in non-contiguous locations of said linear memory, units of data which correspond to pairs of visible images which are contiguous along one of said rows.

9. The electronic apparatus of claim 8 wherein said plurality of visible images further comprises a plurality of rows and columns of images and wherein at least some units of data which correspond to pairs of visible images which are contiguous with each other along one of said rows at stored in locations of said linear memory that are non-contiguous.

10. The electronic apparatus of claim 6 further comprising a circuit responsive to one of said units of data to control the visible image at the corresponding discrete position of said display.

* * * * *